United States Patent
Loder et al.

(10) Patent No.: US 6,854,152 B2
(45) Date of Patent: Feb. 15, 2005

(54) ARTICLE AND PROCESS FOR CLEANING OPTICAL SURFACES

(75) Inventors: Harry A. Loder, Austin, TX (US); Curtis L. Shoemaker, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 215 days.

(21) Appl. No.: 09/997,570

(22) Filed: Nov. 29, 2001

(65) Prior Publication Data

US 2003/0098045 A1 May 29, 2003

(51) Int. Cl.⁷ .......................... A47L 25/00; B08B 11/00
(52) U.S. Cl. .................... 15/210.1; 15/104.94
(58) Field of Search ............................ 15/104.94, 210.1

(56) References Cited

U.S. PATENT DOCUMENTS

| | | |
|---|---|---|
| 3,834,021 A | 9/1974 | White et al. |
| 4,317,249 A | 3/1982 | Benson |
| 4,637,089 A | 1/1987 | Schwarz |
| 4,733,428 A | 3/1988 | Malinge et al. |
| 5,836,031 A | 11/1998 | Cox |
| 5,956,793 A | 9/1999 | Cox |
| 6,006,768 A | 12/1999 | Cox |
| 6,047,716 A | 4/2000 | Shimoji et al. |
| 6,125,227 A | 9/2000 | Cox |
| 6,158,077 A * | 12/2000 | Wenger et al. ............. 15/210.1 |
| 6,209,162 B1 | 4/2001 | Clairadin et al. |

FOREIGN PATENT DOCUMENTS

| | | |
|---|---|---|
| DE | 27 06 556 | 8/1978 |
| DE | 196 31 692 A1 | 2/1998 |
| DE | 201 01 423 U 1 | 8/2001 |
| GB | 2 285 915 A | 8/1995 |

OTHER PUBLICATIONS

Partial Search Report for PCT/US02/32466.
International Search Report for PCT/US02/32466.

* cited by examiner

*Primary Examiner*—Randall Chin
(74) *Attorney, Agent, or Firm*—Melanie G. Gover

(57) ABSTRACT

An article and process for cleaning relatively inaccessible and recessed surfaces, including a shaft having a first end opposite a second end with a cleaning head assembly, including a movable strip of buffing material, at the first end of the shaft. The article has an actuator at the second end of the shaft; and a connector coupling the cleaning head assembly to the actuator to move the movable strip during positional change of the actuator. Repeated positional change of the actuator produces reciprocatory movement in the movable strip of buffing material to produce a rubbing, cleaning action of the material against a recessed surface.

6 Claims, 12 Drawing Sheets

ARTICLE AND PROCESS FOR CLEANING OPTICAL SURFACES

FIELD OF THE INVENTION

The invention relates to an article and process for cleaning optical surfaces particularly optical fibers having surfaces that are inaccessible without the use of special tools.

BACKGROUND OF THE INVENTION

Considering the rapid expansion of the use of cellular phones, increasing demand for access to the Internet, and business use of fiber optic links, there is convincing evidence of a continuing, increasing need to expand the capacity of telecommunications systems. As telecommunications systems expand there is also a need to upgrade essential equipment, such as telephone switching equipment, by replacing copper conductors of older installations with fiber optic signal transmission media. Fiber optics technology offers the superior bandwidth capability that is needed to handle the explosive increase in today's signal traffic.

Replacement of copper conductors by optical fibers has a direct effect upon the backplanes of switching equipment. The use of optical fiber on backplanes presents a unique set of problems including problems of optical fiber alignment and maintaining the cleanliness of optical fiber surfaces. One issue of alignment affects optimal positioning of daughter card fiber optic connectors and receiving connectors located on the backplane. Misalignment of optical fiber ends may cause attenuation of light signals passing through a connection zone between optical fibers. Optical fiber surface cleanliness becomes a problem when exposed ends of optical fibers reside in relatively inaccessible locations within the backplane. The presence of obscuring coatings of dirt particles at the interface between connected optical fibers impedes the passage of light. In the case of single mode fiber products, for example, the working diameter of the fiber is <10 microns and even a small dust particle could cause significant loss in signal.

It is known that the connecting surfaces of optical fibers should be maintained in a highly clean condition, free from contamination. Common causes of contamination include dust, finger oil, skin flakes, and the like. Some contaminants may be easily removed with a lintless wipe or by directing a jet of clean compressed gas towards loose particles to displace them from the surface of the optical fiber. More resistant contaminants such as skin oil require solvent cleaners that may be applied as a pressurized liquid spray. U.S. Pat. No. 4,733,428 describes a liquid spray cleaning tool adapted to clean optical surfaces for which access is difficult. The cleaning tool includes a injector which directs a cleaning liquid, and then a drying gas, under pressure towards the optical surface. An evacuation jacket removes cleaning fluids after application. The tool has a neck to fit onto an optical tip associated with an optical fiber.

Other methods for cleaning optical fiber surfaces include dry methods, as well as wet cleaning methods. Such methods include the use of a solvent rinse, compressed gas, and physical contact of optical fiber ends that may be contained in the ferrules of optical fiber connectors. U.S. Pat. Nos. 5,836,031, 5,956,793, 6,006,768, and U.S. Pat. No. 6,125,227 address a device for cleaning an optical fiber involving the deposit of a cleaning substance on a surface to be cleaned, particularly an optical surface such as a surface of an optical fiber. Description is given of application of both wet and dry substances. The cleaning device is selectively positionable for cleaning the tips of optical fibers which have been installed in a connector, such as a plug or a receptacle. A cleaning device includes a tool body having either a cleaning fluid or substantially dry cleaning media therein, such as a strip of adhesive tape. The adhesive tape may be in the form of a roll on a supply spool. Alternate designs are presented in which the cleaning media is not located in the tool body, but is manually applied to the fibers. Previously described methods are effective primarily when the optical fiber surface, requiring cleaning, is readily accessible.

Removal of contaminants becomes more difficult when optical fibers, that require cleaning, occupy a relatively inaccessible location such as a backplane buried inside a narrow slot through a switch card cage, at distances of sixteen inches or more. The inconvenience of removing optical fibers from backplanes, once installed, establishes the need for tools and techniques with which to accomplish remote cleaning of optical fiber surfaces during access from the front of a switch card cage. Fabric or paper tipped rods, described in U.S. Pat. Nos. 4,637,089 and 6,047,716 and UK Patent Application GB 2,349,070, may be used to reach into housings for optical fiber connectors. U.S. Pat. No. 6,209,162 also addresses this problem using a system for cleaning the end of a ferrule of a fiber optic connector mounted on a backplane of a chassis adapted for receiving a printed circuit board having a mating connector mateable with the fiber optic connector. A dummy circuit board is receivable by the chassis to replace the actual printed circuit board. A cleaner, mounted on the dummy circuit board, cleans the end of the ferrule of the fiber optic connector during insertion of the dummy board in a card slot. This solution brings with it the requirement for a custom fabricated dummy circuit board according to connector type, the dimensions of any structure containing a fiber optic surface and its position on the backplane. Also, the method uses a strip of material moving only in one direction without providing a scrubbing action.

A need exists for relatively simple, universal tools and processes to facilitate cleaning of relatively inaccessible optical fiber surfaces for optimum transmission of light signals.

SUMMARY OF THE INVENTION

The present invention addresses the need for a simple cleaning system for optical surfaces by providing a relatively compact cleaning tool having a cleaning head assembly at one end of a shaft of variable length. A control mechanism, separated from the cleaning head by the length of the shaft, provides a convenient means for remotely initiating cleaning action within the cleaning head assembly. Coupling between the cleaning head and the control mechanism, also referred to herein as an actuator, preferably uses a rod or cable connector. A cleaning article according to the present invention provides a tool capable of reaching through narrow openings to facilitate cleaning of surfaces that would otherwise be inaccessible. Preferably, materials used in the construction of this cleaning tool have sufficient conductivity to bleed accumulated static charge to ground. The benefits of suitable material selection and conventional grounding means, such as grounding cords, tethers and the like, may be used to prevent any incidence of electrostatic damage between the cleaning article and circuit components. Thereafter, the tool and associated cleaning method may be applied for cleaning fiber optic ferrules, located in a backplane, mounted inside a switch card cage.

A method for cleaning recessed surfaces, particularly fiber optic surfaces, as used herein, primarily involves dry cleaning media, wherein the mating faces of optical fibers may be buffed to remove adhering particles and other signal attenuating deposits. It is also possible to provide a means for introducing a liquid cleaning agent during the buffing process.

More particularly, the present invention provides an article for cleaning recessed surfaces, comprising a shaft having a first end opposite a second end with a cleaning head assembly, including a movable strip of buffing material, at the first end of the shaft. The article has an actuator at the second end of the shaft and a connector coupling the cleaning head to the actuator to move the movable strip during adjustment by positional change of the actuator. Repeated adjustment of the actuator produces reciprocatory movement in the movable strip of buffing material to produce a buffing, cleaning action of the material against a recessed surface.

Further consideration shows that the present invention provides an article for cleaning a recessed surface, particularly an optical fiber surface, comprising a shaft having a first end opposite a second end with a cleaning head attached at the first end. The cleaning head assembly includes a socket, for connection to the first end of the shaft and a frame having an open end and a closed end that is attached to the socket. The frame further includes a first flange, having a first channel and a first ledge, and a second flange having a second channel and a second ledge. A projection attached to the closed end of the frame, between the first flange and the second flange, includes a probe tip extending from the open end of the frame for placement adjacent to a recessed surface. The projection has a first groove opposite a second groove, along its length. Included in the cleaning head assembly is a slider having a connecting element, and a first extension opposite a second extension. The slider further has a first runner attached thereto to move in the first groove. The runner includes a tab. During movement of the slider, the first extension slides in the first channel and the second extension slides in the second channel. A retainer that has a first shoulder supported for movement by the first ledge and a second shoulder supported for movement by the second ledge, has a second runner attached to it to move in the second groove of the projection. The second runner includes a tang. A motion restrictor attached to the frame and to the retainer limits movement of the retainer to a portion of the second groove. Connection between the slider and the retainer uses a movable strip of buffing material including a slit positioned over the tab and a slot positioned over the tang. The movable strip passes over the probe tip that may be used to place the strip in contact with a surface.

The article also includes an actuator including a hole to receive the second end of the shaft. The actuator further includes a stationary part and an adjustable part slidingly engaging the stationary part between a first position and a second position. A connector couples the slider of the cleaning head assembly from the connecting element to the adjustable part of the actuator to move the slider, the movable strip, and the retainer during positional change of the actuator to move the adjustable part from the first position to the second position with displacement of the motion restrictor, which thereafter retracts to return the adjustable part to the first position. The movable strip moves with reciprocating movement during repeated operation of the actuator between the first position and the second position to cause a rubbing action of the movable strip against a surface to be cleaned.

The present invention includes a process for cleaning a recessed surface, requiring that an article be provided for cleaning a recessed surface. The article comprises a shaft having a first end opposite a second end and a cleaning head assembly at the first end of the shaft. The cleaning head assembly includes a movable strip of buffing material. An actuator at the second end of the shaft uses a connector to couple the cleaning head assembly to the actuator to move the movable strip during positional change of the actuator. After inserting the cleaning head and a portion of the shaft into an opening in a structure containing at least one recessed surface, contact is made between the movable strip and the recessed surface. Repeated positional change of the actuator causes reciprocation of the movable strip to clean the recessed surface.

Definitions

The terms "recessed surface" and "relatively inaccessible surface" and the like refer to surfaces to be cleaned that otherwise would be inaccessible without the beneficial use of cleaning articles according to the present invention.

The terms "cleaning head" and "cleaning head assembly" are used interchangeably herein to designate a structure including a material strip or belt that reciprocates under the influence of a mechanism including a motion restrictor such as a biasing spring that is located inside a cleaning head assembly.

As used herein the term "actuator" refers to a mechanism that includes a position-changing part, also referred to herein as a "handle" or a "winged collar." The actuator communicates with a cleaning head through a connector for reciprocating movement of a material strip or belt, when the handle or winged collar changes position between selected locations.

The term "projection" refers herein to a central portion of a cleaning head extending from a socket at one end and terminating in a probe tip at the other end. A projection may be formed as a single structure or as a multipart structure, which in one embodiment comprises a projection socket and a projection insert.

The term "projection socket" refers to a portion of preferably a two-part projection. A projection socket accommodates moving parts of the mechanism included in a cleaning head and includes one or more indents for aligning a projection socket with a probe insert.

The term "probe insert" refers to a detachable end portion of a cleaning head assembly according to the present invention. A probe insert includes one or more raised bumps or rounded protrusions that mate with indents of a projection socket to provide alignment and pivotal movement between these parts. Pivotal movement allows deflection of a probe tip covered by a material strip or belt. During insertion of a cleaning head into e.g. a switch card cage the probe insert adjusts to reduce the possibility of displacement or damage to connector components. Adjustable movement of the probe insert improves coplanar alignment between a cleaning material and optical fiber surfaces during positioning of a probe tip for optical fiber surface cleaning.

The term "junction pin" refers to a flexible, preferably metal pin located between the socket bore and the insert bore of a two part projection to facilitate alignment and pivotal movement of a probe insert relative to projection socket.

The term "cleaning strip" means a strip of fabric having sufficient strength, as a cleaning buffing material, to reciprocate, over a probe tip, without tearing.

Use of the term "cleaning cover" refers to an applique that includes a suitable material for cleaning a surface, particularly a fiber optic surface. A carrier belt supports a cleaning cover during cleaning of a surface. This increases the range of cleaning cover materials to include those that lack sufficient durability to provide a self supporting cleaning strip.

The term "carrier belt" refers to a strip of material having sufficient strength to reciprocate over a probe tip without failure during repeated use of a cleaning article according to the present invention. A carrier belt provides support for a cleaning cover releasably attached thereto by any number of fastening techniques including interference fasteners and particularly adhesive bonding.

Terms such as "positional change," "adjustable" and "adjustment" and the like may be used interchangeably herein to refer to motion associated with an actuator and particularly with regard to the variation of location or position of a movable part included in an actuator according to the present invention.

The beneficial effects described above apply generally to the exemplary devices and mechanisms disclosed herein of the cleaning article used to reach otherwise inaccessible optical surfaces to recondition them for optimal transmission of light signals. The specific structures through which these benefits are delivered will be described in detail hereinbelow.

BRIEF DESCRIPTION OF THE DRAWINGS

The invention will now be described in greater detail in the following way of example only and with reference to the attached drawings in which.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled;" this terminology's use contemplates elements being connected together in such a way that there may be other components interstitially located between the specified elements, and that the elements so specified may be connected in fixed or movable relation one to the other.

Figure 1:
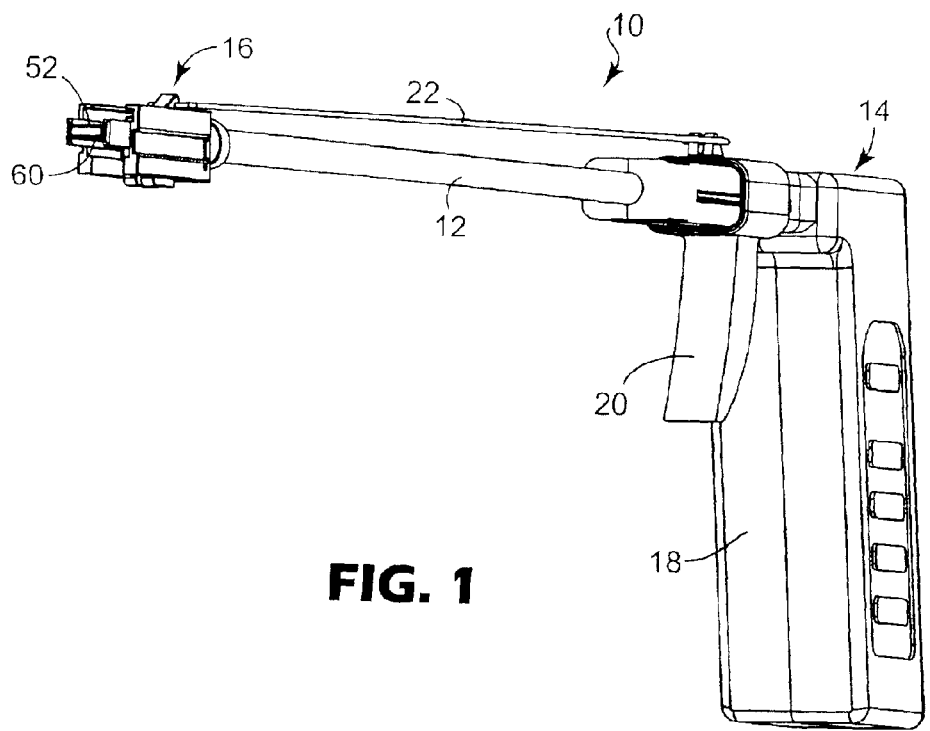
FIG. 1 is a perspective view of a cleaning article according to the present invention for cleaning a substantially recessed surface of one or more optical fibers.

Referring now to the figures wherein like numbers refer to like parts throughout the several views FIG. 1 shows an article 10 for cleaning surfaces of optical fibers according to the present invention. The cleaning article 10 includes a shaft 12 having an actuator 14 mounted at one end and a cleaning head 16 mounted at the other. An actuator 14 includes a grip 18 and a handle 20 slidably engaging a portion of the grip 18. A rod connector 22, coupled between the handle 20 and the cleaning head 16, transmits movement from the handle 20 to the cleaning head 16.

Figure 2:
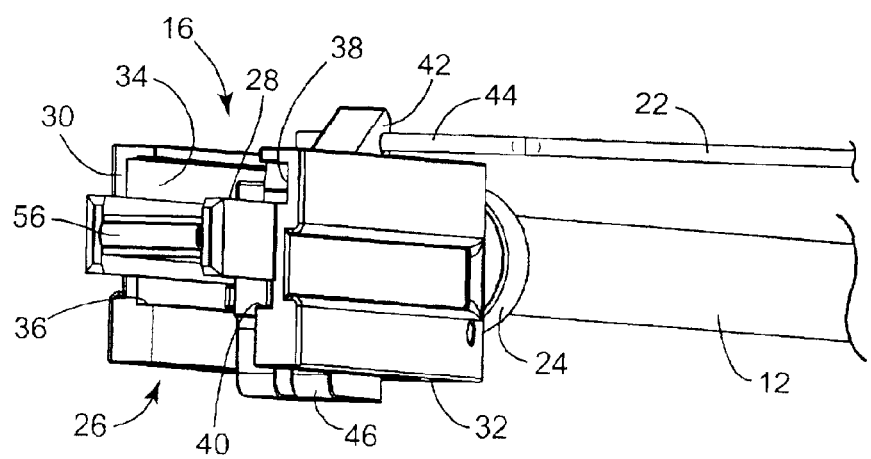
FIG. 2 provides a perspective view of one embodiment of a cleaning head assembly that may be attached to a cleaning article used to reach inaccessible surfaces of optical fibers.

FIG. 2 is a perspective view of a cleaning head 16 according to the present invention. The cleaning head 16 comprises a socket 24 sized to receive an end of the shaft 12 for attachment of the cleaning head 16 to the shaft 12. A frame 26 extending outwardly from the socket 24 includes a projection 28 having a coaxial relationship with the shaft 12. The projection 28 lies between a first flange 30 and a second flange 32. There is a substantially parallel relationship of the first flange 30, the second flange 32 and the projection 28 to each other. Also, the projection 28 and first flange 30 and second flange 32 each have opposing ends one of which is connected to the socket 24 the other end being freely suspended.

The first flange 30 has a first channel 34 and a first ledge 36. Similar features exist in the structure of the second flange 32 that includes a second channel 38 and a second ledge 40. A slider 42, coupled for movement along the length of the projection 28, uses the first channel 34 and the second channel 38 to guide the slider 42 as it moves. The rod connector 22 includes an angled tip 44 as a means for attaching the rod connector 22 to the slider 42 to transmit movement from the handle 20 to the slider 42. A retainer 46 mounted against the side of the projection 28 opposite to the slider 42 has sliding engagement with the first ledge 36 and the second ledge 40. A control spring 48 (see FIG. 3) restricts movement of the retainer 46 relative to the ledges 36, 40.

Figure 3:
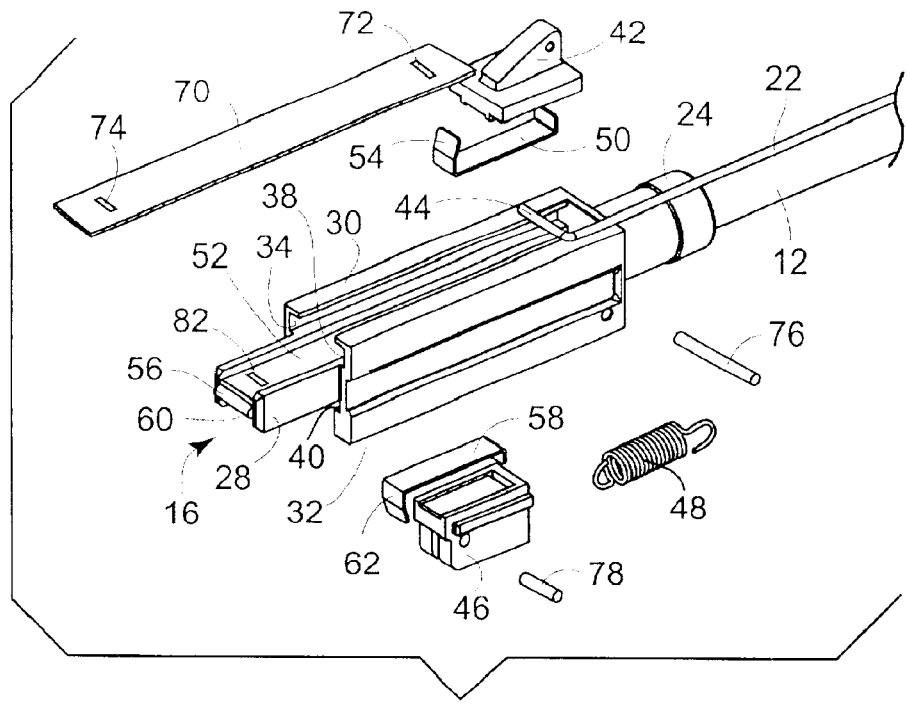
FIG. 3 provides an exploded perspective view of the cleaning head assembly of FIG. 2

FIG. 3 is an exploded perspective view of a cleaning head 16 according to the present invention showing parts previously described and other parts needed for effective cleaning action. A first runner 50, held to the slider 42 by gripping contact, has a size that allows the first runner 50 to ride in a first groove 52 formed in the projection 28. The first runner 50 includes a tab 54 disposed towards a probe tip 56 formed in the free end of the projection 28.

A second runner 58, held to the retainer 46 by gripping contact, has a size that allows the second runner 58 to ride in a second groove 60 formed in the projection 28. The second runner 58 includes a tang 62 disposed towards the probe tip 56 formed in the free end of the projection 28. Assembly of the cleaning head 16 places the first runner 50 and the second runner 58 on opposite sides of the projection 28, in the first groove 52 and second groove 60 respectively.

A cleaning strip 70 has a slit 72 at one end and a slot 74 at the other. The slit 72 has a size to accommodate the tab 54 of the first runner 50 while the tang 62 of the second runner 58 has a size for engaging the slot 74 of the cleaning strip 70. This allows the cleaning strip 70 to be held between the slider 42 and the retainer 46. A fully assembled cleaning head 16 has a central portion of the cleaning strip 70 folded over the surface of the probe tip 56. Any number of materials may be used for the cleaning strip 70 including woven fabrics, non-woven materials and other types of cleaning sheet or film products having durability to resist damage by rubbing and application of tensile force.

The control spring 48 limits movement of the retainer 46 as a function of the pressure applied to the handle 20 of the actuator 14, when the cleaning strip 70 provides connection between the slider 42 and the retainer 46. A retention rod 76 holds one end of the control spring 48 between the first flange 30 and the second flange 32. A pin 78 provides attachment of the other end of the control spring 48 to the body of the retainer 46. Application of pressure to the handle 20 causes movement of the rod connector 22. The rod connector 22 transmits the movement to the slider 42 via the coupling of the angled tip 44. In response, the slider 42 moves towards the actuator 14. This induces movement of the cleaning strip 70, which draws the retainer 46 towards the probe tip 56 against the biasing force of the control spring 48. Alternating pressure strokes, followed by release strokes, against the handle 20 of the actuator 14 produces reciprocating movement of the slider 42, the cleaning strip 70, and the retainer 46. Retraction forces of the control spring 48 return the handle 20 to its starting position after each pressure stroke. This produces a rubbing motion of the cleaning strip 70 against the probe tip 56 and any surface in contact with the other side of the cleaning strip 70, such as a fiber optic surface. Other methods of achieving a reciprocating motion of the cleaning strip 70 could be employed without departing from the scope of the present invention. Also, a cleaning strip 70 may use adhesive bonding, thermal welding, sonic welding, staples and the like as means to optionally secure the free ends of a cleaning strip 70 to a slider 42 and a retainer 46. It is preferable to use removable means, including adhesives and interference connectors, for attaching a cleaning strip 70 to the slider 42 and the retainer 46.

Figure 4:
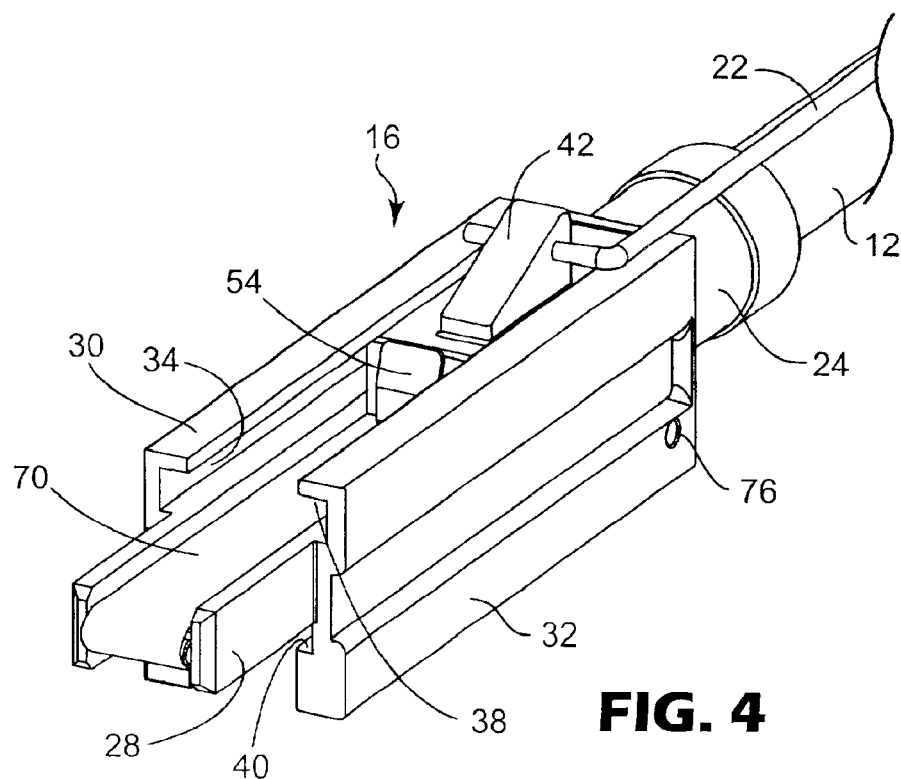
FIG. 4 is a perspective view having a cleaning strip attached to a cleaning head according to the present invention.

FIG. 4 provides an illustration of a cleaning head 16 assembled according to the previous description to provide a reciprocating cleaning medium, preferably in the form of a suitable fabric strip 70 that uses a remote mechanism, e.g. an actuator 14 to produce a rubbing motion of the cleaning strip 70 in contact with a surface to be cleaned. A suitably sized cleaning head 16 and rod connector 22, may be guided into an interfacing relationship with the fiber or group of fibers inside a recessed optical fiber connector, or buried deep within a card cage. The reciprocating action of a cleaning strip 70 displaces dirt and other contaminants from the optical fiber surfaces.

Figure 5:
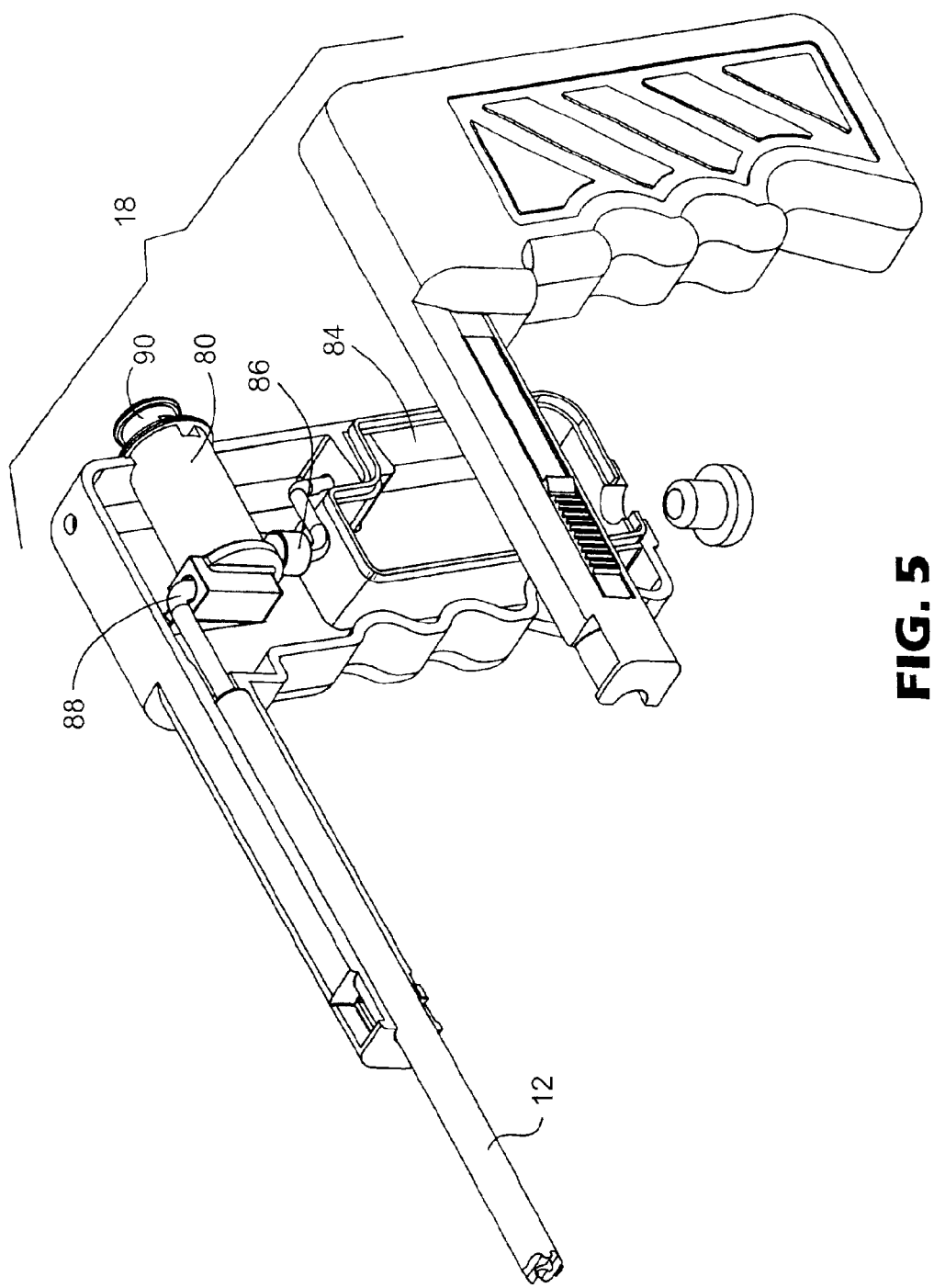
FIG. 5 is an exploded perspective view illustrating the incorporation of a fluid pump in the grip of an actuator for a cleaning article according to the present invention.

FIG. 5 shows an exploded perspective view of a grip 18 adapted to contain a conventional fluid pump unit 80. This unit 80 provides fluid using the hollow grip 18 as a fluid reservoir 84. Fluid from the grip 18 travels through a leak-proof hollow shaft 12 into a hollow projection 28 that includes an optional fluid release opening 82 adjacent to the probe tip 56 (see FIG. 3). Fluid from the fluid opening 82 soaks into an absorbent cleaning strip 70. The dampened strip thereafter cleans by both washing and rubbing action. The pump 80 comprises a pump suction inlet 86 and a pump pressure outlet 88 and a means for controlling liquid flow 90. The pump 80 may be operated using the handle 20 or other suitable pump control method. In another embodiment, the fluid pump 80 may be housed inside the grip 18 with provision for connection to an external reservoir.

Figure 6:
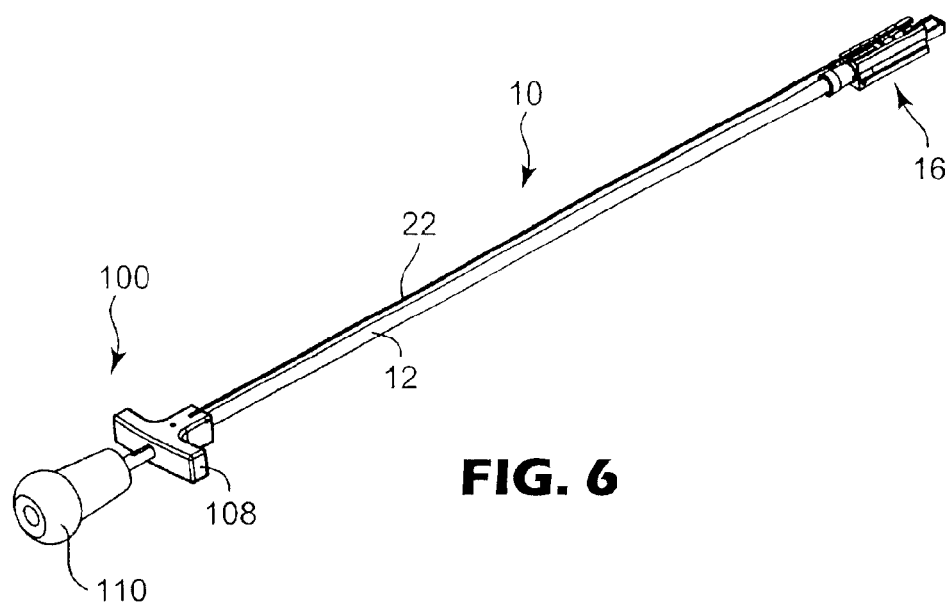
FIG. 6 shows a perspective view of an alternate embodiment of a cleaning article for optical fiber surfaces according to the present invention.
Figure 7:
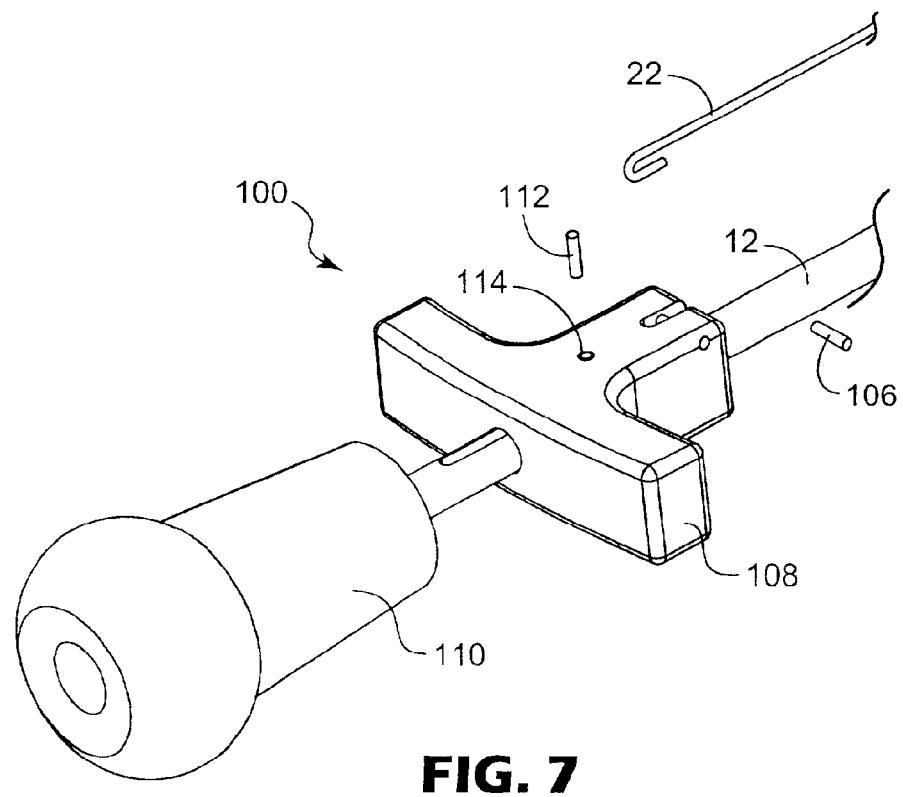
FIG. 7 provides a detail perspective view of an actuator for a cleaning article according to the present invention.
Figure 8:
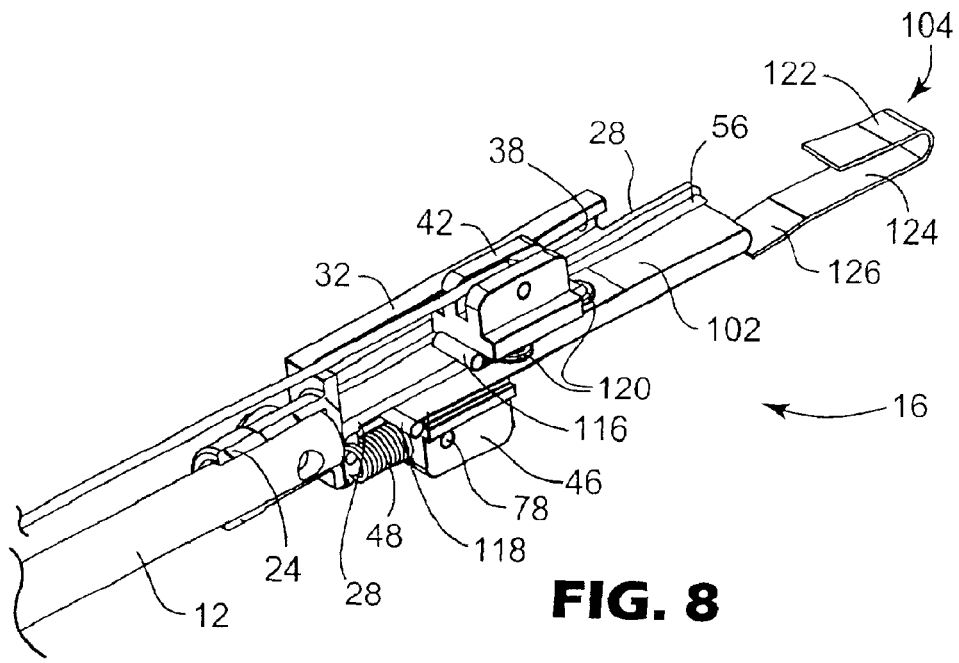
FIG. 8 shows an exploded perspective view of a cleaning head according to the alternate embodiment of a cleaning article as shown in FIG. 6.

FIG. 6 shows an alternate embodiment of a cleaning article 10 using a different actuator 100 to produce reciprocating movement of a cleaning strip 70 comprising a carrier belt 102 and cleaning cover 104 (see FIG. 8 for detail). The actuator 100 is shown in detail in FIG. 7, wherein a fastener 106 connects the rod connector 22 to a winged collar 108 mounted for movement on the shaft 12 of the cleaning article 10. An end stop 110 prevents the winged collar 108 from detaching from the end of the shaft 12. Internal threads inside the end stop 110 may engage male threads formed on the end of shaft 12 to join the two parts together. The end stop 110 provides a fixed element having a spaced-apart relationship from the winged collar 108 sufficient for drawing the winged collar 108 towards the end stop 110. Preferably, in this embodiment of a cleaning article 10, the winged collar 108 provides a shape for easy gripping using two fingers while cupping the end stop 110 in the palm of the hand. This design facilitates repeated squeezing motions, to provide reciprocating movement of the carrier belt 102 as previously described for the cleaning strip 70. Upon release of the squeezing force, retraction forces associated with a control spring 48, as described above, transmit movement to the rod connector 22 to set the winged collar 108 back to its original position. An end portion of the shaft 12 may be split or have a depression formed therein to receive an orienting pin 112 inserted through a opening 114 in the winged collar 108 to ride in the opening or depression as the winged collar 108 moves along the shaft 12. This prevents the winged collar 108 from rotating about the axis of the shaft 12.

FIG. 8 provides an exploded perspective view of a cleaning head 16 that has a similar structure to that previously described. The illustration includes a carrier belt 102 as a support for a cleaning cover 104 that makes contact with one or more fiber optic surfaces during the process of cleaning.

A carrier belt 102 according to the present invention comprises any of a number of materials including woven fabrics and film composites such as a laminated structure of polyethylene terephthalate film adhesively laminated to a low surface energy, slippery film of polytetrafluoroethylene. The carrier belt 102 material is folded to form loops through which spring pins 116 and 118 may be inserted. An eyelet 120 or other suitable fastener means secures each free end of the laminated material of the carrier belt 102.

Figure 9:
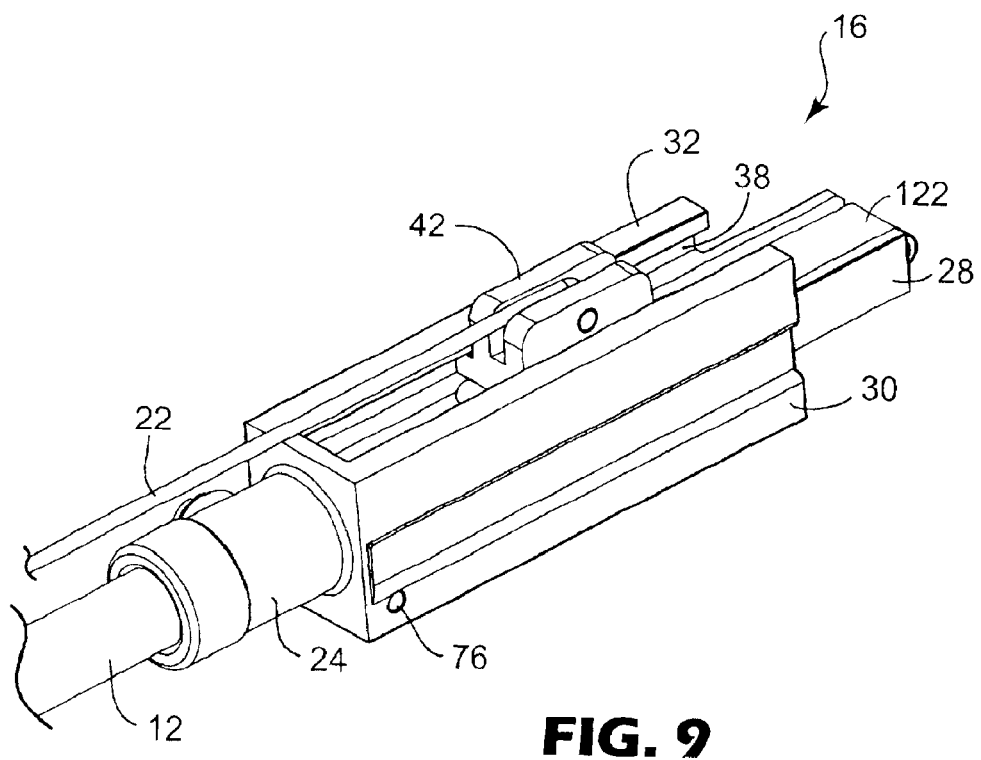
FIG. 9 shows a perspective view of an assembled cleaning head of the alternate embodiment of FIG. 6.
Figure 10:
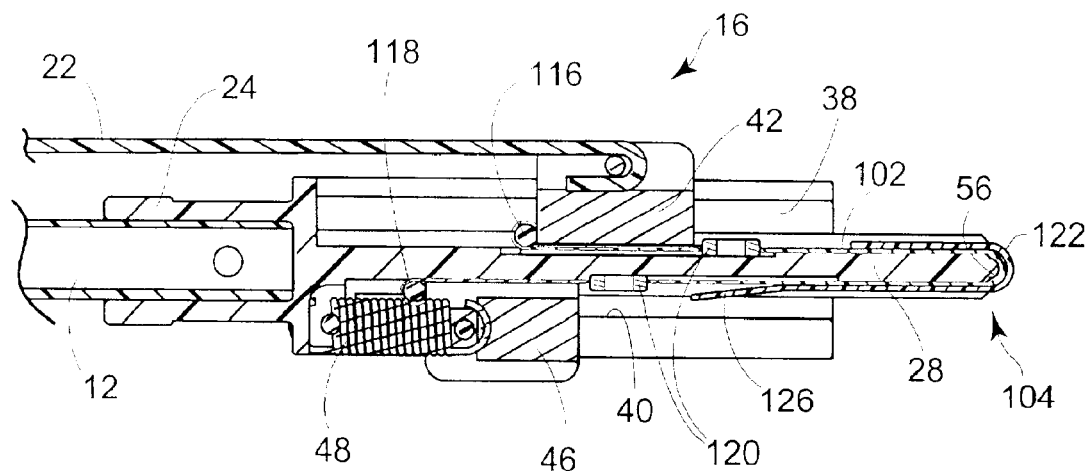
FIG. 10 is a cross section of a cleaning head according to the alternate embodiment of the present invention.

FIG. 9 and FIG. 10 show an assembled cleaning head 16 that retains a carrier belt 102, held against the projection 28, by clamping one end of the carrier belt 102 under the slider 42 and the other end of the carrier belt 102 under the retainer 46. The looped ends of the carrier belt 102 become enlarged by insertion of the spring pins 116, 118. This prevents the carrier belt 102 from slipping between the projection 28 and slider 42 on one side of the projection 28 and the retainer 46 on the other. The slider 42 is held between the first channel 34 and the second channel 38 while the retainer 46 has restricted movement against the first ledge 36 and the second ledge 40. Once assembled, the carrier belt 102 is positioned such that the slider 42 is forward of the first spring pin 116 such that the carrier belt 102 is trapped but free to move with movement of the slider 42. The second spring pin 118 provides an anchor point for the carrier belt 102 against the retainer 46. Application of force to the rod connector 22, moving the slider 42 toward the socket 24, introduces a corresponding force in the carrier belt 102. The carrier belt 102 extends the control spring 48 holding the retainer 46 as the carrier belt 102 passes across the probe tip 56 of the projection 28. Release of the rod connector 22 allows the control spring 48 to retract causing the slider 42 and the upper portion of the carrier belt 102 to move forward. Back and forth, reciprocating movement of the carrier belt 102 results in a scrubbing action taking place when the carrier belt 102 supports a releasable cleaning cover 104. A cleaning cover 104 includes a buffing material 122, coated with an adhesive 124. The adhesive 124 provides attachment of the buffing material 122 to the carrier belt 102 over the probe tip 56. Although illustrated with a single, optional release tab 126, a cleaning cover 104 may have more than one release tab 126 to assist in detaching the cleaning cover 104 from the carrier belt 102 after the buffing material 122 outlives its useful life. A cleaning cover 104 adhered to the carrier belt 102, as described, will move with the carrier belt 102, under the influence of the actuator 14 to effect buffing and cleaning of one or more optical fiber surfaces positioned in fiber optic ferrules to make contact with the buffing material 122.

Figure 11:
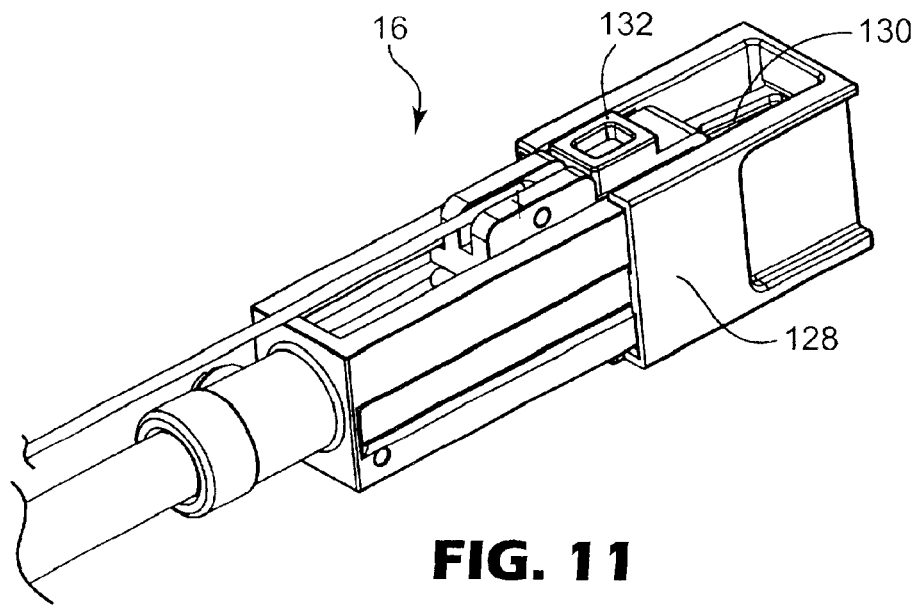
FIG. 11 is a perspective view of a cleaning head including an applicator.
Figure 12:
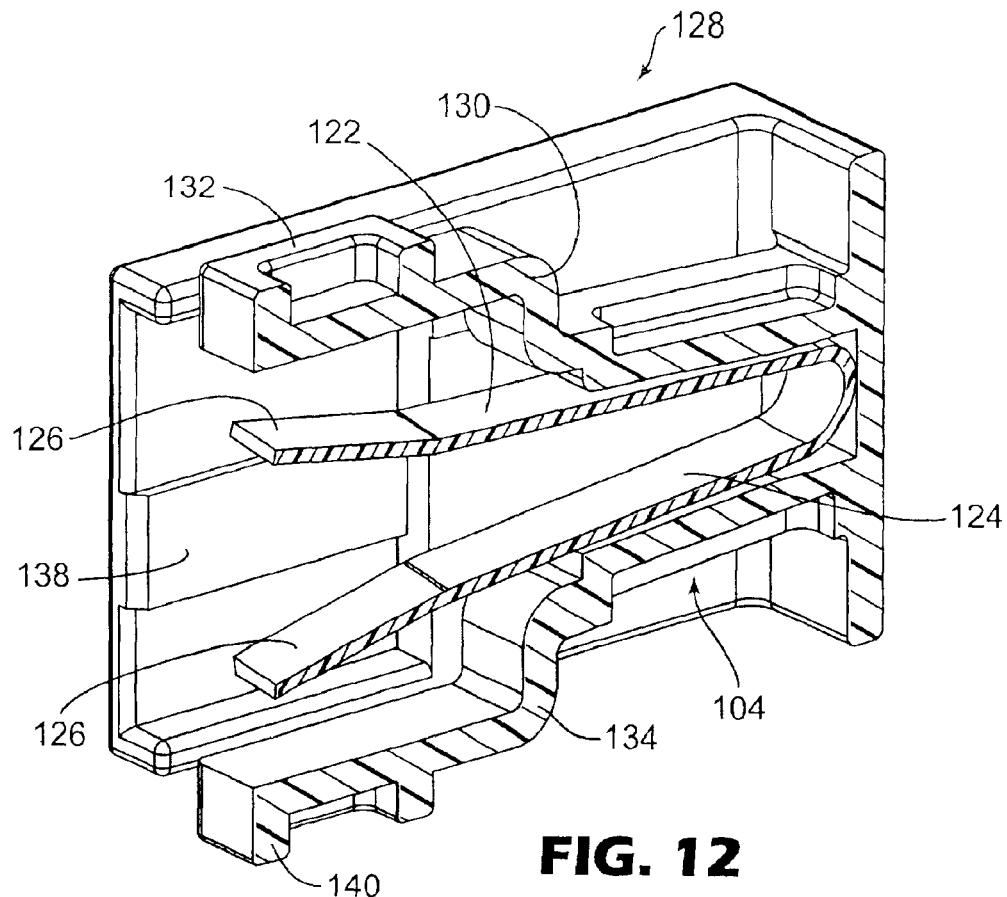
FIG. 12 is a cross sectional perspective view showing the positioning of a cleaning cover inside an applicator according to the present invention.

FIG. 11 shows the cleaning head 16 as illustrated in FIG. 9 including a applicator 128 positioned to install a cleaning cover 104 over the end of a carrier belt 102 wrapped around the probe tip 56 of a projection 28. FIG. 12 is a perspective cross sectional view of the interior of the applicator 128 showing a first cantilever arm 130 including a stud 132 for depressing the resilient cantilever arm 130. The cantilever arm 130 forms a V-shaped recess with a second cantilever arm 134. This recess places the cleaning cover 104 in the proper position for the application to the carrier belt 102. The cleaning cover 104 resides in the V-shaped recess to prevent surfaces coated with adhesive 124 from prematurely bonding together. Inside the recess, the buffing material 122 makes contact with the inside surfaces of the cantilevers 130, 134 so that the adhesive 124 faces the open end 138 of the applicator 128 suitably positioned for attachment to a carrier belt 102. After placing an applicator 128 over a projection 28, to provide contact between the adhesive 124 of the cleaning cover 104 and the surface of the carrier belt 102, the application of pressure to the studs 132, 140 moves the first and second cantilever arms 130, 134, thereby compressing the cleaning cover 104 to increase the contact force between the carrier belt 102 and the adhesive 124, which is preferably a pressure sensitive adhesive. This process applies the cleaning cover 104 without touching the cleaning surface of the buffing material 122. Alignment keys may be molded into the applicator 128 and the cleaning head 16 for accurate positioning between the cleaning cover 104 and the carrier belt 102. The cleaning cover 104 attachment to the carrier belt 102 is releasable by pulling on the release tab 126. This allows ready renewal of buffing material 122 as needed to maintain optimal cleaning of optical surfaces such as ferruled optical fibers.

Figure 13:
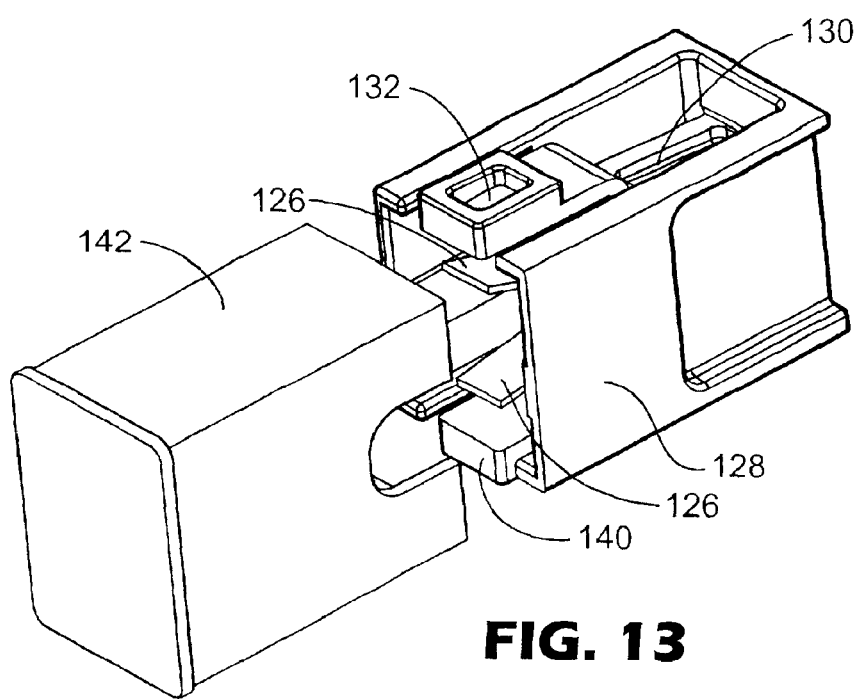
FIG. 13 provides an exploded perspective view showing the relative positioning of an applicator prior to insertion into a protective housing.

FIG. 13 provides an exploded perspective view showing the relative positioning of an applicator 128 prior to insertion into a protective housing 142. The protective housing 142 prevents contamination and physical abuse of the cleaning cover 104.

Figure 14:
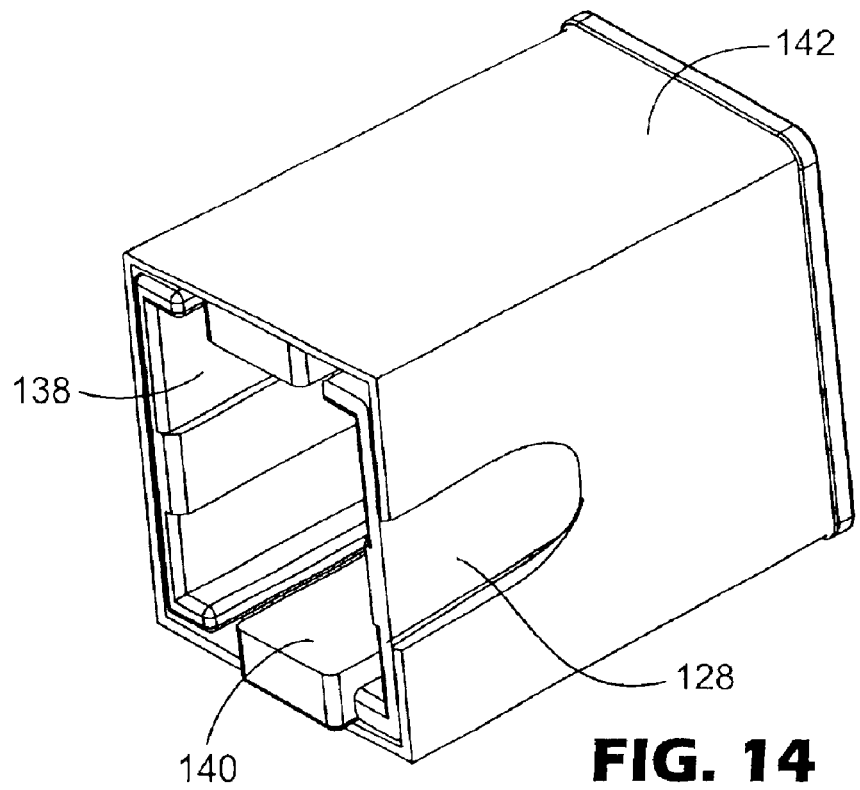
FIG. 14 is a perspective view of an applicator inside a protective housing according to the present invention.
Figure 15:
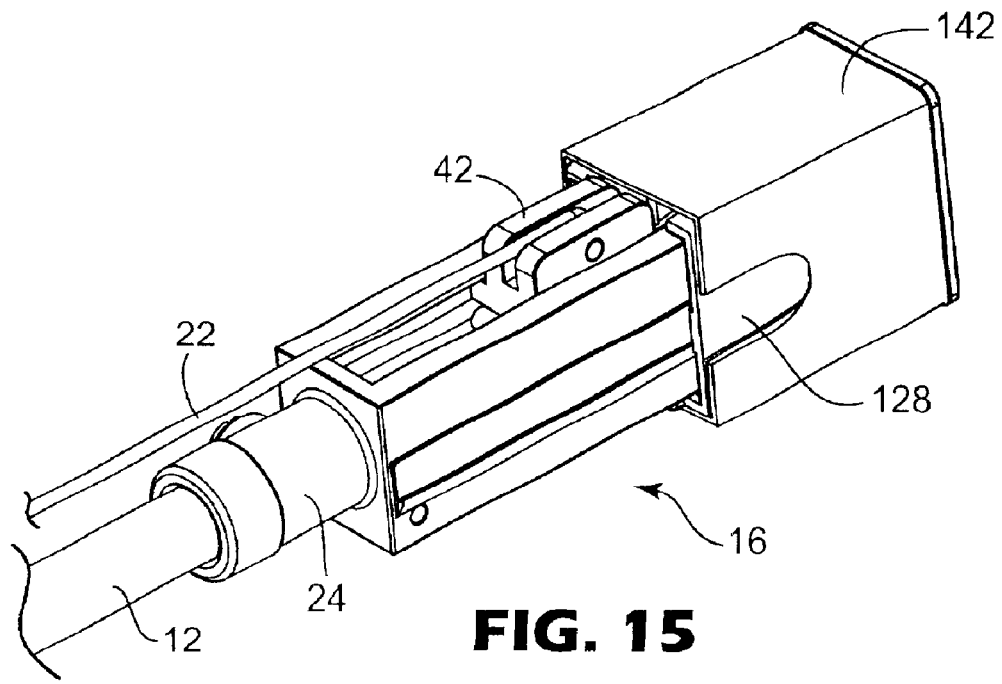
FIG. 15 is a perspective view showing a protective housing over an applicator placed over a cleaning head according to the present invention.

FIG. 14 is a perspective view of a protective housing 142 according to the present invention showing an applicator 128 positioned inside the protective housing 142 so that the open end 138 of the applicator 128 is exposed, in preparation for transferring a cleaning cover 104 from the applicator 128 to the carrier belt 102 of a cleaning head 16. The transfer may be accomplished as shown in FIG. 15 by placing the applicator 128 and protective housing 142, as a unit, over the end of the cleaning head 16 so that a cleaning cover 104 makes contact with a carrier belt 102. From the position shown, the protective housing 142 may be removed from the applicator 128 to allow deflection of the cantilever arms 130,134, which causes adhesive connection of the cleaning cover 104 to the carrier belt 102, as described previously. The combination of the protective housing 142 and applicator 128 provides a protective cap that maintains a cleaning cover 104 in a substantially contaminant-free condition before and during application to the carrier belt 102. A protective cap, as described above, may accompany a cleaning article 10 according to the present invention for placement over the cleaning head 16 during storage and after each use of the cleaning article 10 for removing dirt and other contaminants from fiber optic surfaces.

Figure 16:
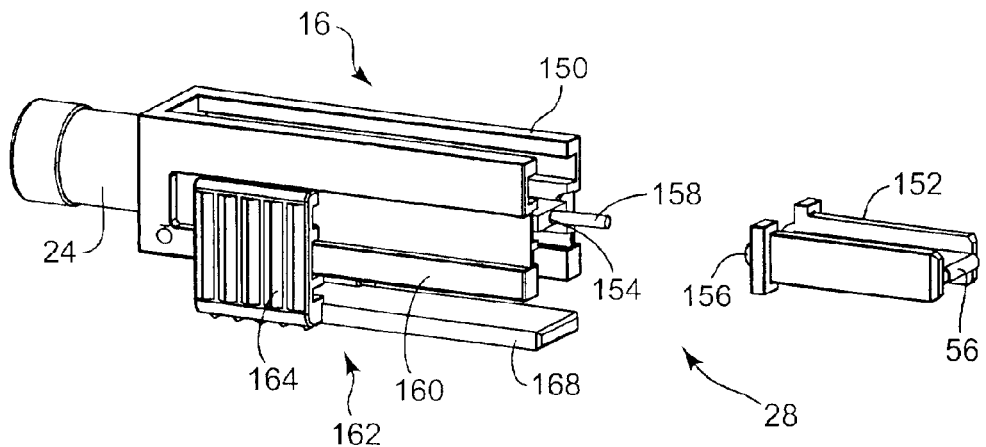
FIG. 16 is an exploded perspective view of a preferred cleaning head according to the present invention.

FIG. 16 illustrates a preferred cleaning head assembly 16 wherein the body of the projection 28 includes a projection socket 150 and a probe insert 152. A junction pin 158, situated between a socket bore 154 and an insert bore 156, provides alignment and limited pivoting of the probe insert 152 relative to the projection socket 150. The amount of deflection is determined by the flexibility of the junction pin 158 and its clearance inside the walls of the socket bore 154 and the insert bore 156. At least one raised bump or rounded protrusion, on a mating face or edge of a probe insert 152, may releasably engage a corresponding indent of a projection socket 150 to provide further alignment between these parts 150, 152. After assembly of the cleaning head 16, engagement of protrusions with indents allows the probe insert 152 to pivot in a controlled manner. Engagement between protrusions and indents represents the formation of hub structures for controlling the pivoting movement of a probe insert.

A cleaning head 16 that includes a pivoting probe insert 152 provides a cleaning article 10 that flexes during insertion of the cleaning head 16 into a connector to be cleaned. A deflecting probe insert 152 reduces the possibility of displacement or damage to connector components, and improves co-planar alignment between cleaning material 122 and optical fiber surfaces during positioning of a probe tip 56 for optical fiber surface cleaning.

A preferred projection socket 150 according to the present invention has a guide rail 160 formed in each of its opposing outer walls. The rails 160 facilitate suspension of an applicator guide 162 from the projection socket 150. An applicator guide 162 includes a guide bracket 164 integrally formed on either side of a guide tongue 168. The guide brackets 164 contact the guide rails 160 for movement of the applicator guide 162 along the length of the projection socket 150 between an extended position and a withdrawn position, close to the socket 24 of the cleaning head. An applicator guide 162 facilitates accurate placement of a cleaning cover 104 over the folded end of a carrier belt 102.

Figure 17:
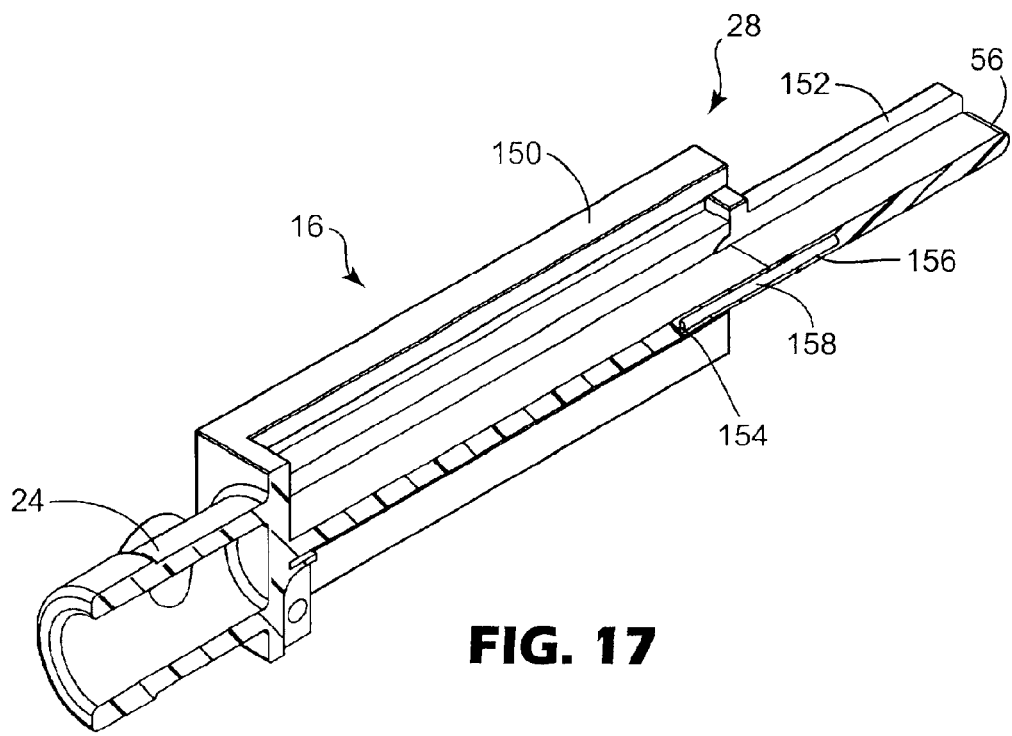
FIG. 17 shows a cross sectional perspective view of a portion of a cleaning head assembly.

FIG. 17 is a perspective cross section showing attachment of a probe insert 152 to a projection socket 150 using a junction pin 158 positioned between the socket bore 154 and the insert bore 156. The junction pin 158 has variable flexibility depending on the material used for its fabrication. Preferably the material is a resilient spring steel, but a pin or dowel of any suitable material could be used to align the probe insert 152 to the projection socket 150. It is possible that the junction pin 158 develops a friction fit within the bores 154,156 but this is not essential since the carrier belt 102 also holds the probe insert 152 in position in a fully assembled cleaning head 16.

Figure 18:
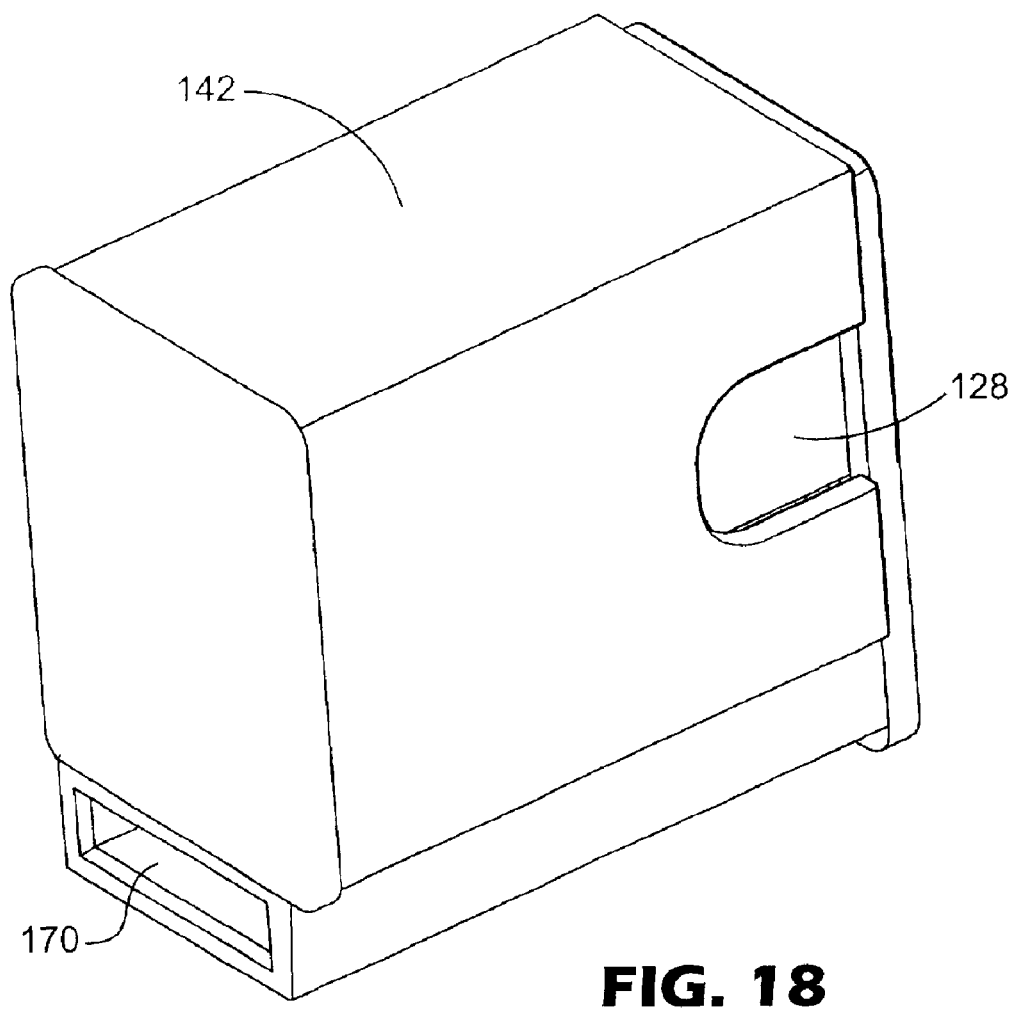
FIG. 18 provides a perspective view of a cleaning cover applicator positioned inside a protective housing according to the present invention.
Figure 19:
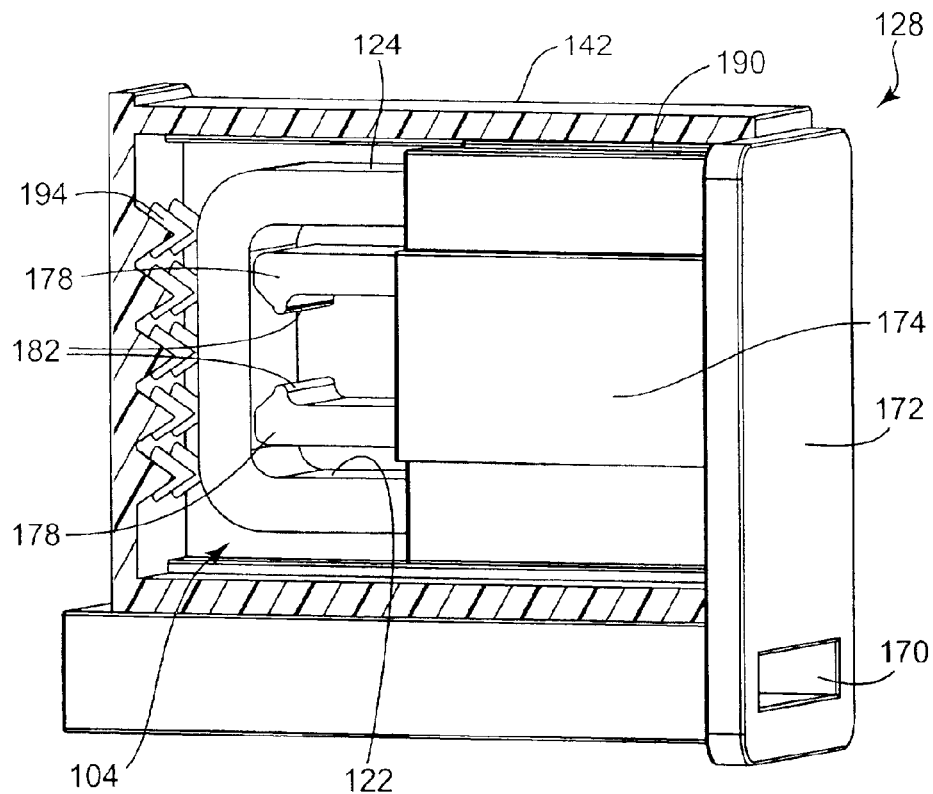
FIG. 19 is a cutaway perspective view of a cleaning cover applicator inside a protective housing.
Figure 20:
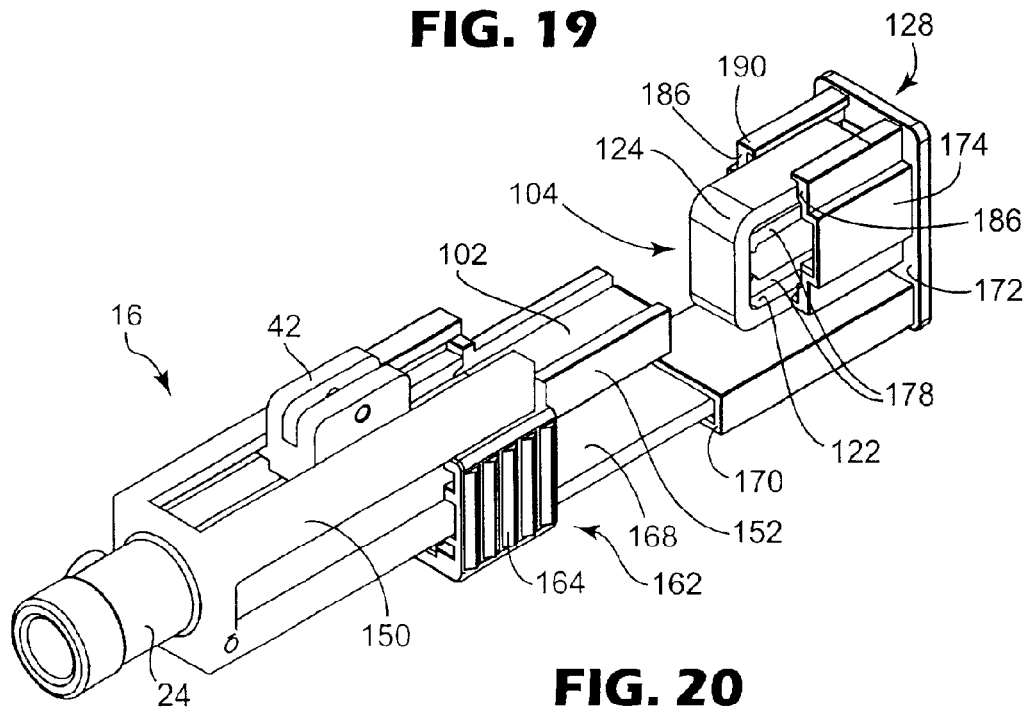
FIG. 20 provides a perspective view showing alignment of a cleaning head and an applicator prior to releasably attaching a cleaning cover to a carrier belt that is folded over the probe tip of the cleaning head.

FIG. 18 is a perspective view of a preferred applicator 128, according to the present invention, inserted in a protective housing 142. The applicator 128 includes a guide passage 170 located to receive the guide tongue 168 of an applicator guide 162, attached to a projection socket 150. FIG. 19 is a cutaway view providing detail of the internal structure of an applicator 128 inside a protective housing 142. The applicator 128 performs the same function as that previously discussed, which is to apply a cleaning cover 104 to the portion of a carrier belt 102 folded over the probe tip 56 of a probe insert 152. As illustrated in FIG. 19 and FIG. 20, an applicator 128 includes an applicator base 172 integrally formed with a guide passage 170. The base 172 has a wing 174 extending from each of its opposing sides. Between the wings 174, a pair of cantilevered beams 178 extends from the base 172, projecting beyond the free ends of the wings 174. Each cantilever beam 178 has a smoothing bar 182 to provide pressure for substantially wrinkle-free lamination of a cleaning cover 104 to a carrier belt 102 as previously described. A suitably sized cleaning cover 104 may be positioned in the applicator 128 such that the buffing material 122 side of the cleaning cover 104 wraps around the cantilevered beams 178. This places the adhesive 124 at the exposed surface of the cleaning cover 104. Retention of the cleaning cover 104 in a folded condition relies upon correct placement of the ends of the cleaning cover 104 in receiving channels 186 formed in each of the wings 174 attached to the applicator base 172. At the outer edge of each receiving channel 186, a ridge 190 exerts a slight gripping force on a very small portion of the edges of the cleaning cover 104. Preferably there is minimum contact between the ridges 190 and the adhesive 124 at the edges of the cleaning cover 104. For this reason, the ridge 190 may be either continuous or discontinuous along its length providing it maintains a cleaning cover 104 in a folded condition inside the applicator 128. After loading a cleaning cover 104 into an applicator 128 according to the present invention, careful placement of a protective housing 142 over an applicator 128 provides protection of the exposed adhesive 124 from contamination, which could occur by deposit of particles or other materials that could transfer to an unprotected adhesive 124. The protective housing 142 provides suitable clearance between its inner wall and the surface of the adhesive 124. Cone shaped bumps 194, at the inside wall of the closed end of the protective housing 142, reduce surface contact between the adhesive 124 and the protective housing 142 to prevent attachment of the cleaning cover 104 to the inside of the protective housing 142. Even limited bonding of adhesive 124 to the inside of the protective housing 142 could cause premature disengagement of a cleaning cover 104 from an applicator 128 simply by withdrawing the protective housing 142 from the applicator 128. The bumps 194 that limit bonding contact between an adhesive 124 and the inside of a protective housing 142 may have a variety of shapes without limitation to the cone shaped structures described above. Other shapes or methods involving rod projections, surface textures and adhesive release coatings fall within the scope of the present invention.

FIG. 20 is a perspective view showing the relative positioning of a cleaning head 16 and an applicator 128 prior to transfer of a cleaning cover 104 from the applicator 128 to the folded portion of a carrier belt 102. In this position the applicator guide 162 has been moved to the end of the projection socket 150 farthest from the cleaning head socket 24 placing the guide tongue 168 beyond the probe tip 56 (covered by the carrier belt 102). Insertion of the guide tongue 168 in the guide passage 170 places a cleaning cover 104 in the correct alignment for attachment to a carrier belt 102. While maintaining alignment, the guide tongue 168 may move during movement of the applicator 128 towards the carrier belt 102.

Figure 21:
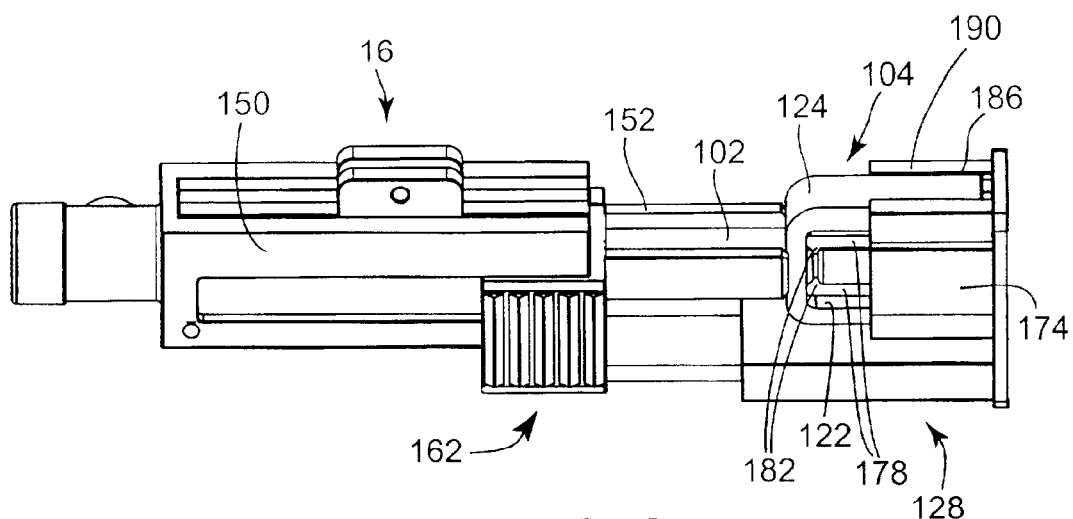
FIG. 21 is a side view showing contact between a carrier belt and a cleaning cover before transfer of the cleaning cover from an applicator according to the present invention.

FIG. 21 shows intermediate positioning of an applicator 128 and a cleaning head 16 wherein the adhesive 124 contacts the leading edge of the folded portion of the carrier belt 102. Continued movement of the applicator 128 towards the cleaning head 16 causes the cleaning cover 104 to wrap over the carrier belt 102. As the applicator 128 advances, the cleaning cover 104 withdraws from the receiving channels 186 to be gripped between the cantilever beams 178 and the probe tip 56 as the probe tip 56 penetrates the space between the cantilever beams 178. This causes the cantilever beams 178 to separate as the smoothing bars 182 apply pressure against the buffing material 122 to adhere the cleaning cover 104 to the carrier belt 102. Upon completion of the process of applying a cleaning cover 104 to a carrier belt 102 the applicator guide 162 may be returned to a position near the cleaning head socket 24 to allow separation of the applicator 128 from the probe insert 152.

Figure 22:
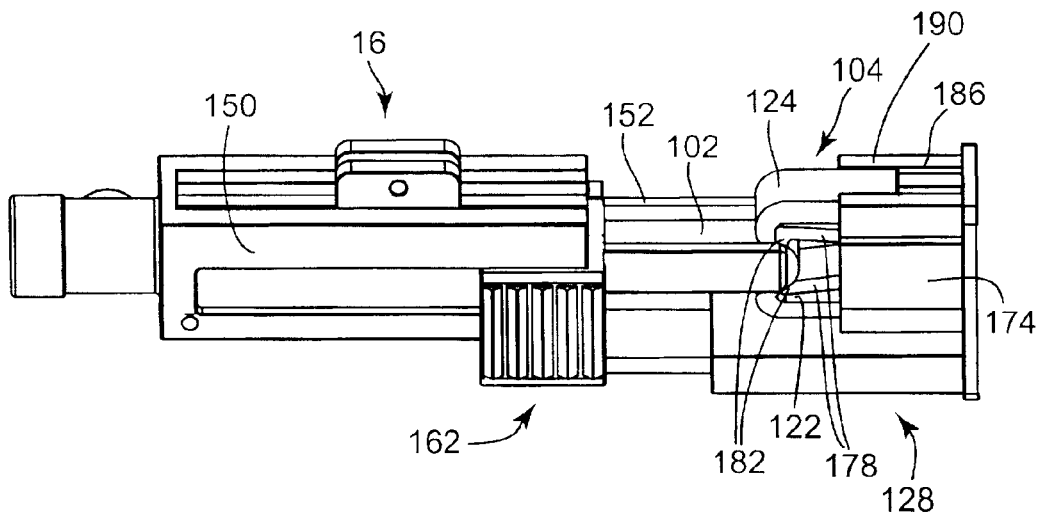
FIG. 22 provides a perspective view of a cleaning cover partially transferred around the folded portion of a carrier belt of a cleaning head.

FIG. 22 illustrates a later stage in the process of applying a cleaning cover 104 to a carrier belt 102 wherein the cleaning cover 104 has become bonded to the carrier belt 102 over the probe tip 56. Pressure will be applied to the applicator 128 until the ends of the cleaning cover 104 exit from the ends of the receiving channels 186 to follow the contour of the carrier belt 102. A cleaning cover 104 of a preferred embodiment is not bonded along its length to the surface of a carrier belt 102 but has, as previously discussed, at least one release tab 126 used to remove the cleaning cover 104 when its cleaning effectiveness begins to decline. A cleaning head 16 comprising a carrier belt 102 and cleaning cover 104 has a key advantage over a single material cleaning strip 70, due to the variety of cleaning media that may be produced in the form of a cleaning cover 104. The carrier belt 102 design provides support for more cleaning options than would be possible by simply relying on the integrity of a cleaning strip 70 to survive the repeated reciprocating forces associated with use of a cleaning article 10 according to the present invention.

Cleaning articles according to the present invention rely upon a dry buffing process to remove particles and contaminating deposits from target surfaces, particularly optical fiber surfaces. Difficulties in removing final traces of contaminants may be overcome, in certain instances, by applying a fluid wash or directing a blast of compressed gas before, during, or after cleaning with the buffing tool alone. The previously mentioned use of a cleaning head 16 including a fluid release opening 82 indicates one means for combining wet and dry cleaning methods. As an alternative, fluid or gas delivery may involve a separate process using e.g. liquid spray bottles or cylinders of compressed gas. Considering the need for optimum surface cleaning a cleaning article 10 according to the present invention could find use in a kit with other cleaning utensils such as liquid spray bottles, dry fabric wipes and the like. A kit would have particular value based upon demonstrated benefits accruing from the use of wet and dry methods together compared to the efficacy of wet or dry methods alone.

An article, for cleaning relatively inaccessible surfaces, and its component parts, has been described herein. These and other variations, which will be appreciated by those skilled in the art, are within the intended scope of this invention as claimed below.

What is claimed is:

1. An article for cleaning recessed surfaces, comprising:
 a shaft having a first end opposite a second end;
 a cleaning head assembly at said first end of said shaft, said cleaning head assembly including a socket to attach said cleaning head assembly to said shaft, said socket attached to a frame that includes projection to direct a movable strip toward a recessed surface, wherein said projection further includes a first groove opposite a second groove, said movable strip located adjacent to said first groove and said second groove while moving during positional change of said actuator, said movable strip providing connection between a slider and a retainer, said slider being movable in said first groove, said retainer held to said frame by a motion restrictor to limit movement of Said retainer in said second groove;
 an actuator at said second end of said shaft; and
 a connector coupling said cleaning head to said actuator to move said movable strip during positional change of said actuator.

2. The article of claim 1, wherein said motion restrictor is a control spring.

3. The article of claim 1, wherein said actuator includes a stationary part and an adjustable part having a first position and a second position, said adjustable part coupled to said connector to move said movable strip during positional change of said adjustable part between said first position and said second position.

4. The article of claim 3, wherein said stationary part is a grip and said adjustable part is a handle engaging said grip.

5. The article of claim 1, wherein said actuator includes a stationary part and an adjustable part having a first position and a second position, said stationary part mounted securely at said second end of said shaft that passes through said adjustable part, said connector coupled to said adjustable part to move said movable strip during positional change of said adjustable part between said first position and said second position.

6. An article for cleaning a recessed optical fiber surface comprising:
 a shaft having a first end opposite a second end;
 a cleaning head assembly comprising:
  a socket for connection to said first end of said shaft;
  a frame having a closed end and an open end; said closed end attached to said socket, said frame further including a first flange having a first channel and a first ledge, and a second flange having a second channel and a second ledge;
  a projection attached to said closed end of said frame, between said first flange and said second flange, said projection including a probe tip extending from said open end of said frame for placement adjacent a recessed optical fiber surface, said projection having, along its length, a first groove opposite a second groove;
  a slider having a connecting element, and a first extension opposite a second extension, said slider further having a first groove attached thereto to move in maid first groove, said runner including a tab, said first extension being slidable in said first channel and said second extension being slidable in said second channel;
  a retainer having a first shoulder supported for movement by said first ledge and a second shoulder supported for movement by said second ledge, said retainer having a second runner attached thereto to move in said second groove of said projection, said second runner including a tang;
  a motion restrictor attached to said frame and to said retainer to limit movement of said retainer to a portion of said second groove; and
  a movable strip including a slit positioned over said tab and a slot positioned over said tang, said movable strip passing over said probe tip for contact with an optical fiber surface and to provide connection between said slider and said retainer;
 an actuator including a bole to receive said second end of said shag, said actuator further including a stationary part and an adjustable part slidingly engaging said stationary part between a first position and a second position; and
 a connector coupling said slider of said cleaning head assembly from said connecting element to said adjustable part of said actuator to move said slider, said movable strip, said retainer during positional change of said actuator to move said adjustable part from said first position to said second position with displacement of said motion restrictor, which thereafter retracts to return said adjustable part to said first position, said movable strip executing reciprocating movement during repeated operation of said actuator between said first position and said second position to cause a rubbing action of said movable strip against an optical fiber surface.

* * * * *

UNITED STATES PATENT AND TRADEMARK OFFICE
CERTIFICATE OF CORRECTION

PATENT NO. : 6,854,152 B2
DATED : February 15, 2005
INVENTOR(S) : Loder Harry A.

It is certified that error appears in the above-identified patent and that said Letters Patent is hereby corrected as shown below:

Title page,
Item [56], References Cited, FOREIGN PATENT DOCUMENTS, please add the following:
-- GB 2349070 A        10/25/2000      U.K. --

Column 13,
Line 28, after "includes" insert -- a --.
Line 37, delete "Said" before "retainer" and insert -- said -- therefor.

Column 14,
Line 7, delete "end;" and insert -- end, -- therefor.
Line 9, after "flange" insert -- , --.
Line 21, delete "groove" and insert -- runner -- therefor.
Line 22, delete "maid" and insert -- said -- therefor.
Line 41, delete "bole" and insert -- hole -- therefor.
Line 42, delete "shag" and insert -- shaft -- therefor.
Line 49, after "strip," and insert -- and --.

Signed and Sealed this

Twenty-eighth Day of June, 2005

JON W. DUDAS
*Director of the United States Patent and Trademark Office*